US007843891B2

United States Patent
Ren et al.

(10) Patent No.: US 7,843,891 B2
(45) Date of Patent: Nov. 30, 2010

(54) MOBILE NODE DATA TRANSMISSION RATE SELECTION

(75) Inventors: Wenge Ren, Sunnyvale, CA (US); Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 824 days.

(21) Appl. No.: 11/432,778

(22) Filed: May 11, 2006

(65) Prior Publication Data

US 2007/0263572 A1   Nov. 15, 2007

(51) Int. Cl.
H04W 4/00 (2009.01)
(52) U.S. Cl. ...................................................... 370/338
(58) Field of Classification Search .................. 370/338,
370/325, 480, 328, 343, 381, 487, 496, 319,
370/344, 334, 342, 331, 329; 455/403, 343.4,
455/63.1, 445, 101, 63.4
See application file for complete search history.

(56) References Cited

U.S. PATENT DOCUMENTS

| | | | |
|---|---|---|---|
| 5,471,469 A | 11/1995 | Flammer, III et al. | |
| 5,572,528 A | 11/1996 | Shuen | |
| 6,044,062 A | 3/2000 | Brownrigg et al. | |
| 6,097,703 A | 8/2000 | Larsen et al. | |
| 6,249,516 B1 | 6/2001 | Brownrigg et al. | |
| 6,493,377 B2 | 12/2002 | Schilling et al. | |
| 6,879,574 B2 | 4/2005 | Naghian et al. | |
| 7,542,421 B2 * | 6/2009 | Srikrishna et al. | 370/235 |
| 2004/0147262 A1 * | 7/2004 | Lescuyer et al. | 455/434 |
| 2004/0158863 A1 * | 8/2004 | McLain | 725/73 |
| 2004/0171347 A1 | 9/2004 | Burton et al. | |
| 2004/0203787 A1 | 10/2004 | Naghian | |
| 2004/0252643 A1 | 12/2004 | Joshi | |
| 2005/0271021 A1 * | 12/2005 | Alemany et al. | 370/338 |
| 2005/0286440 A1 | 12/2005 | Strutt et al. | |
| 2006/0007882 A1 | 1/2006 | Zeng et al. | |
| 2006/0171356 A1 * | 8/2006 | Gurelli et al. | 370/329 |
| 2007/0002742 A1 * | 1/2007 | Krishnaswamy et al. | 370/235 |
| 2007/0123194 A1 * | 5/2007 | Karaoguz et al. | 455/403 |
| 2008/0205358 A1 * | 8/2008 | Jokela | 370/338 |

OTHER PUBLICATIONS

Aquayo et al., Link-level Measurements from an 802.11b Mesh Network, Sep. 2004, SIGCOMM'04, Carnegie Mellon University.

* cited by examiner

Primary Examiner—Melody Mehrpour
(74) Attorney, Agent, or Firm—Brian R Short

(57) ABSTRACT

An apparatus and method of a mobile access node selecting a data transmission rate is disclosed. The method includes the mobile access node receiving beacons from a plurality of wireless clusters. Each beacon advertises a data transmission rate a gateway of the wireless cluster that originates the beacon. The mobile access node identifies at least one qualified routing path. The at least one qualified routing path includes a best quality routing path, and other routing paths having a quality within a predetermined margin of the best quality routing path. The mobile access node selects the data transmission rate of the mobile access node to be the lowest data transmission rate advertised by beacons of the at least one qualified routing path.

15 Claims, 4 Drawing Sheets

MOBILE NODE DATA TRANSMISSION RATE SELECTION

FIELD OF THE INVENTION

The invention relates generally to wireless communications. More particularly, the invention relates to a method and apparatus for mobile node data transmission rate selection.

BACKGROUND OF THE INVENTION

Wireless networks can include a wireless device being connected to a network through a base station that is wired to the network. The wireless device can transmit data packets that are received by the base station and then routed through the network. The wireless network can include many base stations that are each wired to the network. Wireless network can also include wireless access nodes that form a wireless mesh.

FIG. 1 shows a prior art mesh network that includes a gateway 110 connecting a client device 140 to a network (internet) 100 through fixed access nodes 120, 130. The connections between the gateway 110 and the access nodes 120, 130 can be wireless. Additionally, the connection between the access nodes 120, 130 and the client 140 can be wireless. Wireless connections typically are subject to conditions that can make the connections unreliable. Such conditions include fading, multi-path and signal interference.

Each of the access nodes of the mesh network can have several possible paths to a gateway. Each access node must select a route which desirably is the best possible route to a gateway.

Some mesh networks can additionally include mobile access nodes. Mobile access nodes are generally engineered to be mounted inside automotive vehicles and draw power from the battery of the vehicle. They are also engineered to meet environmental and thermal specifications relevant to the automotive environments. By contrast, fixed access nodes are typically engineered to be mounted on streetlights, utility poles, cable strands and the like and to accept a wide variety of AC and DC voltages. They are typically engineered to meet a different set of environmental specifications including different thermal requirements, wind-loading, lightning- and surge-protection, etc. Mobile access nodes add another layer of complexity because typically optimal routes and optimal data transmission rates continually change for mobile access nodes. Therefore, the routing and data transmission rate selections for a mobile access node are more complex than the routing and data transmission rate selections for a fixed access node.

It is desirable to have a wireless network that provides for data transmission rate selection of the mobile access nodes.

SUMMARY OF THE INVENTION

An embodiment of the invention includes a method of a mobile access node selecting a data transmission rate. The method includes the mobile access node receiving beacons from a plurality of wireless clusters. Each beacon advertises a data transmission rate of the wireless cluster that originates the beacon. The mobile access node identifies at least one qualified routing path. The at least one qualified routing path includes a best quality routing path, and other routing paths having a quality within a predetermined margin of the best quality routing path. The mobile access node selects the data transmission rate of the mobile access node to be the lowest data transmission rate advertised by beacons of the at least one qualified routing path.

Another embodiment of the invention also includes a method of selecting a data transmission rate of mobile access nodes within a wireless mesh network. The method includes a plurality of gateways originating beacons in which each gateway originates the beacons at a predetermined rate. The beacons advertise a data transmission rate of a cluster associated the gateways that originated the beacon. A mobile access node receives beacons from a plurality of the clusters. The mobile access node identifies at least one qualified routing path. The at least one qualified routing path includes a best quality routing path, and other routing paths having a quality within a predetermined margin of the best quality routing path. The mobile access nodes selects the data transmission rate of the mobile access node to be the lowest data transmission rate advertised by beacons of the at least one qualified routing path.

Other aspects and advantages of the present invention will become apparent from the following detailed description, taken in conjunction with the accompanying drawings, illustrating by way of example the principles of the invention.

DETAILED DESCRIPTION

Figure 1:
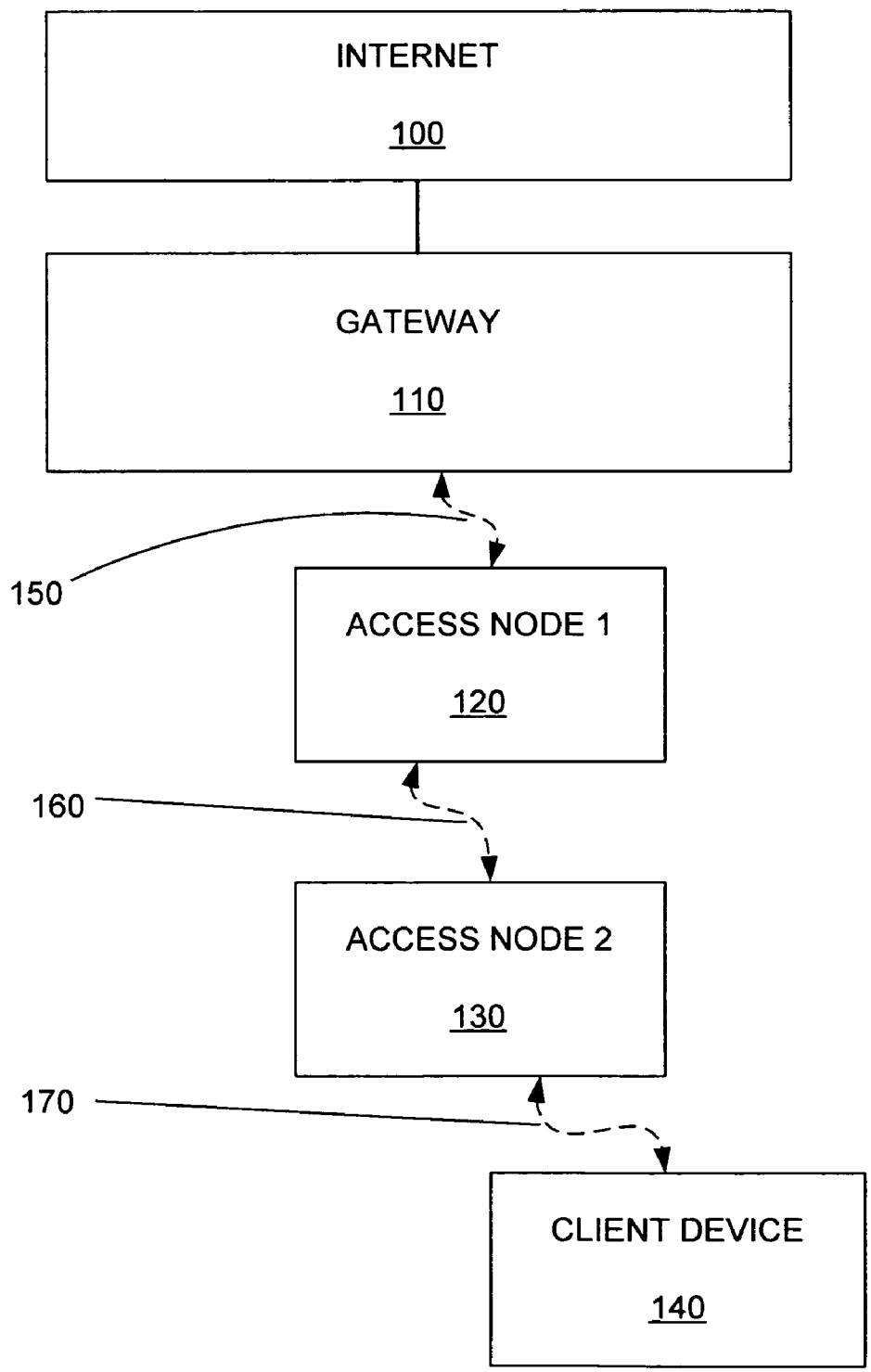
FIG. 1 shows a wireless network that includes access nodes that suffer from various types of signal degradation.

As shown in the drawings for purposes of illustration, the invention is embodied in an apparatus and method for a mobile access node data transmission rate selection. The mobile access node provides network access for a client through a mesh network that can include fixed and mobile access nodes.

Mobile access nodes can be used to extend the coverage area afforded by the fixed access nodes. In addition, mobile access nodes can also provide network connectivity to client devices which are either wireless-enabled or are directly plugged into an Ethernet port on the mobile access node. Mobile access nodes can connect wirelessly to the mesh network and join it through fixed or mobile access nodes.

Fixed access nodes are typically mounted on streetlights, utility poles, cable strands and the like. An embodiment of mobile access nodes are designed to be mounted inside an automobile, typically in the trunk, and drawing power from the battery of the automobile. Fixed access nodes can connect together wirelessly to form a mesh network that provides coverage to wireless client devices such as laptops or PDAs equipped with wireless radios. A fraction of the fixed access nodes can have provisioned backhaul over fiber or Ethernet or WiMax or other point-to-point or point-to-multipoint wireless backhaul.

Mesh networks have several advantages over other wireless access networks including resilience to failures, fewer backhaul requirements, ease of deployment, ability to self-configure and self-heal, etc. Wireless mesh networks are deployed in indoor LAN environments as well as in outdoor metro-area deployments covering many tens or hundreds of square miles.

Figure 2:
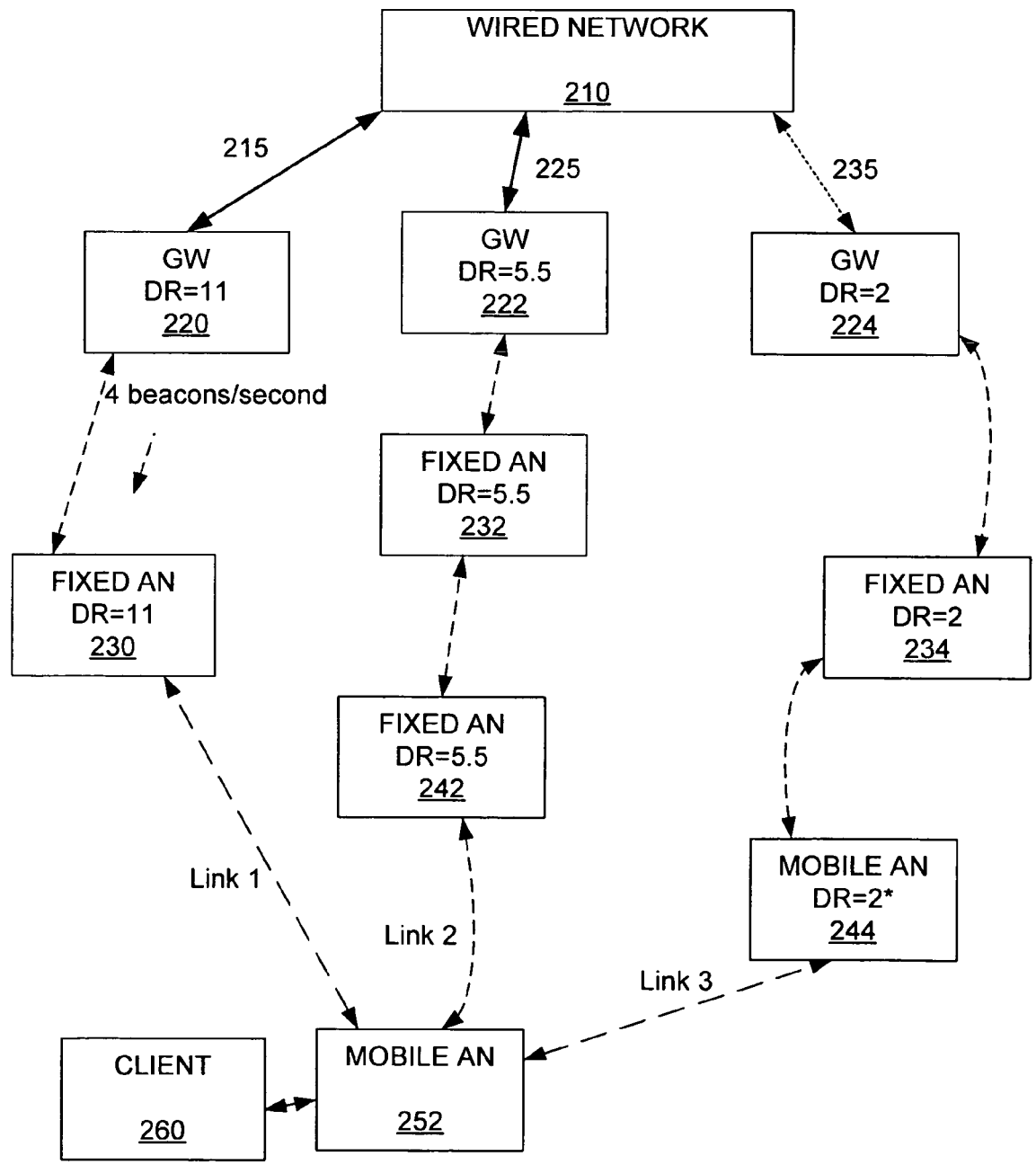
FIG. 2 shows one example of a wireless mesh network that can utilize methods of mobile access node data transmission rate selection.

FIG. 2 shows one example of a wireless mesh network that can utilize methods of mobile access node data transmission rate selection. The wireless mesh network includes a wired network 210 which can be connected, for example, to the internet. The wireless mesh network includes gateways 220, 222, 224 which can be wired or wirelessly connected to the wired network 210 through backhaul links 215, 225, 235.

Each of the gateways 220, 222, 224 originates routing beacons (packets). An embodiment includes the routing beacons being originated at a predetermined rate to allow for routing selections through the wireless mesh network. The routing beacons include a data transmission rate associated with the originating gateway 220, 222, 224.

The wireless mesh network includes first level access nodes 230, 232, 234. The first level access nodes 230, 232, 234 are access nodes that are located one wireless hop away from a gateway 220, 222, 224. The number of hops an access node is located away from a gateway is typically dependent on routing selections made from each access node to the available gateways. As will be described, the routing selections can be made based upon the routing beacons. The routing beacons are received by all first level access nodes 230, 232, 234. The first level access nodes 230, 232, 234 modify the received routing beacons and rebroadcast the modified routing beacons. The modified routing beacons include (typically, along with routing path information) the data transmission rate of the upstream gateway.

The upstream gateway of an access node is determined by the access nodes selecting a route to the upstream gateway based on a quality parameter of the received routing beacons. One quality parameter that can be used to select a route is a persistence of the received routing beacons. For example, the gateways can originate routing beacons at a rate of 4 beacons per second. Therefore, the access nodes can determine the persistence by comparing the number of received routing beacons per second with the number originated per second. Each access node selects the upstream gateway providing the best quality routing beacons.

As shown in FIG. 2, the first level access nodes 230, 232, 234 are all fixed wireless access nodes. This, however, does not have to be the case. Each level of access node can be either a fixed or mobile access node.

The wireless mesh network can also include second level access nodes 230, 242, 244. The second level access nodes are locate two wireless hops away from a gateway. Again, the number of hops an access node is located away from a gateway is typically dependent on routing selections made from each access node to the available gateways. As shown in FIG. 2, two of the access nodes 230, 232 are fixed and one access node is mobile, however, any number of the second level access nodes can be fixed or mobile.

Each of the gateways 220, 222, 224 defines a cluster. A cluster includes a gateway, and all access nodes connected directly or indirectly (through a routing path with intermediate upstream access nodes) to the gateway. All of the access nodes of a cluster of a gateway have the same data transmission rate as advertised in the routing beacons originated at the gateway.

As shown in FIG. 2, a first gateway 220 has a data transmission rate of 11 Mbps, a second gateway 222 has a data transmission rate of 5.5 Mbps, and a third gateway 224 has a data transmission rate of 2 Mbps. The access node 230 of the first cluster of the first gateway 220 must have the same data transmission rate of 11 Mbps as the first gateway 220. The access nodes 232, 242 of the second cluster of the second gateway 222 must have the same data transmission rate of 5.5 Mbps as the second gateway 222. The access nodes 234, 244 of the third cluster of the third gateway 224 must have the same data transmission rate of 2 Mbps as the third gateway 224.

Data Transmission Rates of Cluster

As previously stated, each cluster includes a gateway that broadcasts routing beacons that include a data transmission rate of the gateway and all access nodes associated with the cluster. Generally, the data transmission rate of a cluster is predetermined by the quality of links between the gateway and the access nodes of the cluster. A cluster having higher quality links between access nodes and the gateway will typically be able to sustain a higher data transmission rate than a cluster having lower quality links between the access nodes and the gateway.

Higher data rates require transmission signals between access nodes and gateways to have higher signal to noise ratios (SNRs). To maintain a higher SNR, the transmission signals should not suffer much attenuation when traveling through the links of the mesh network. Generally, short links cause less transmission signal attenuation.

Several factors can influence the quality of the links, such as, the distance between the access nodes of the cluster. Greater distances between access nodes generally lead to greater attenuation of signals traveling through links between the access nodes, and therefore, a result in lower quality links.

Generally, there are only a finite number of data transmission rates. One set of possible data transmission rates are those as defined by the IEEE 802.11 standard.

The mobile access node 252 as shown in FIG. 2 must select from one of the three clusters as designated by links 1, 2 and 3. If selected, the link 1 connects the mobile access node 252 to the first cluster having a data transmission rate of 11 Mbps. If selected, the link 2 connects the mobile access node 252 to the second cluster having a data transmission rate of 5.5 Mbps. If connected, the link 3 connects the mobile access node 252 to the third cluster having a data transmission rate of 2 Mbps.

Mobility of Mobile Nodes

As defined by their functionality, mobile access nodes are mobile. As such, mobile access nodes can move from cluster to cluster of a wireless mesh network. As has been described, the data transmission rates of each cluster can be different. Therefore, as a mobile access node roams from one cluster to another cluster, the mobile access node should select a data transmission rate that corresponds with the data transmission rate the cluster of the wireless mesh network the mobile access node is connected to. One embodiment includes the mobile node selecting a routing path to a gateways based upon the routing beacons originating at the gateways. The routing beacons advertise the data transmission rate of the corresponding cluster. It is to be understood the routing beacon quality is one example of how a routing path is selected. Other methods can be used to selecting routing paths.

Figure 3:
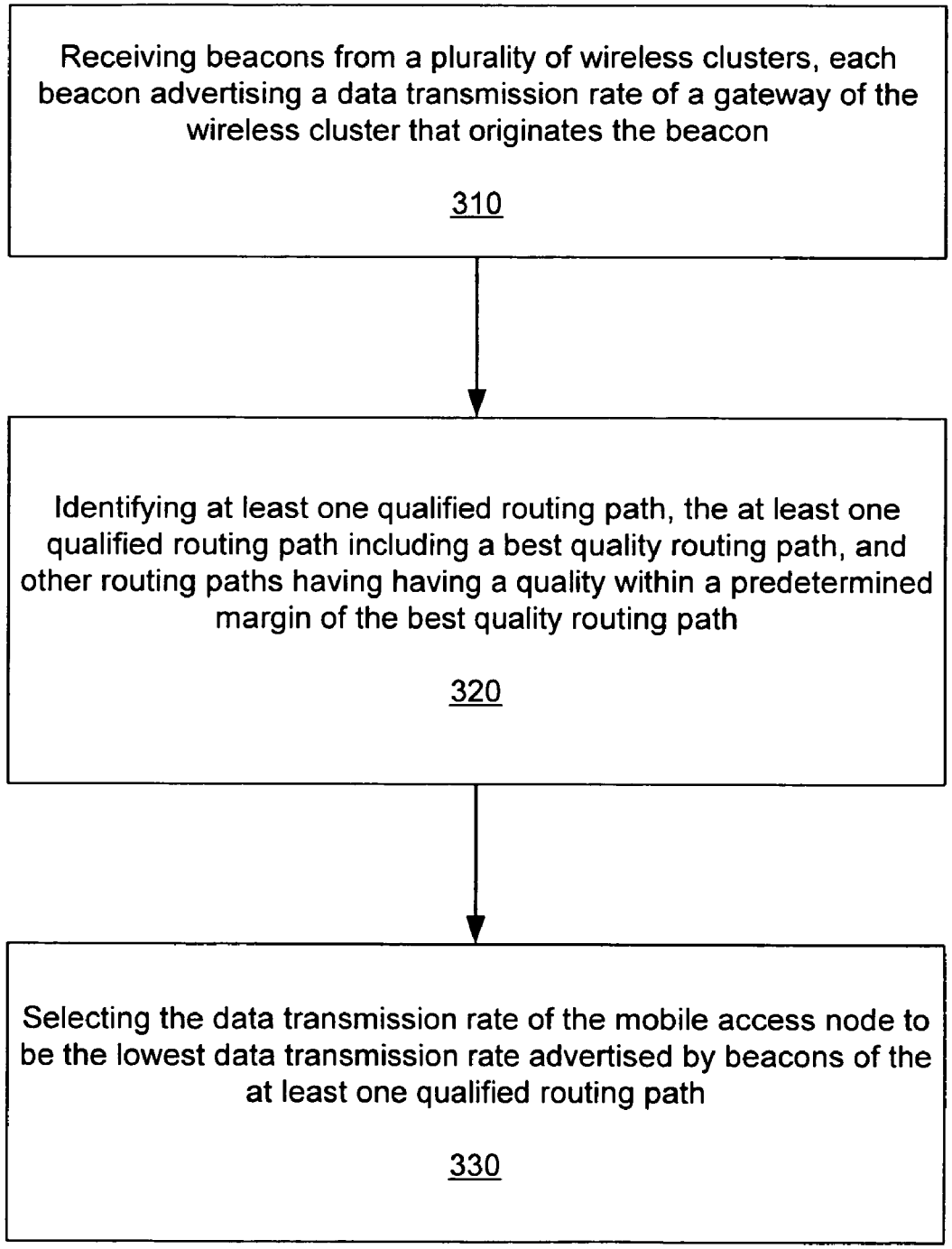
FIG. 3 is a flow chart showing one embodiment of a method of a mobile access node selecting a data transmission rate.

FIG. 3 is a flow chart showing one embodiment of a method of a mobile access node selecting a data transmission rate. A first step 310 includes the mobile access node receiving beacons from a plurality of wireless clusters, each beacon advertising a data transmission rate of a gateway of the wireless cluster that originates the beacon. A second step 320 includes identifying at least one qualified routing path, the at least one qualified routing path including a best quality routing path, and other routing paths having a quality within a predetermined margin of the best quality routing path. A third step 330 includes selecting the data transmission rate of the mobile access node to be the lowest data transmission rate advertised by beacons of the at least one qualified routing path.

The beacons can be routing beacons, and the quality of received routing beacons can be calculated by a persistence of routing beacons received by the mobile access node. As previously described, the persistence of received routing beacons can be compared with the rate at which the routing beacons are originated at a gateway. Comparing the routing packets received from various upstream access nodes and gateways can allow the mobile access node to select the best routing path to an upstream gateway. As described, the data transmission rate of each cluster is determined by data transmission rate advertised within the routing beacons originating at a gateway associated with the cluster.

As previously described, the mobile access node that receives routing beacons rebroadcasts the routing beacons at a rate in which they are successfully received. This allows other mobile access nodes to associate with the mobile access node, and join the same cluster as the mobile access node. The routing beacons rebroadcast by the mobile access node advertise the data transmission rate advertised by the cluster the mobile access node is connected to.

Qualified Routing Paths

As previously stated, a set of routing paths are qualified. More specifically, one embodiment includes at least one qualified routing path being identified. The at least one qualified routing path includes a best quality routing path based upon a quality of the received routing beacons, and other routing paths having received routing beacons having a quality within a predetermined margin of the best quality routing path. For example, a margin can be specified as 10% in which case all routing paths that are of path quality within 10% of the best quality routing path are determined to be qualified routing paths.

The qualified paths do not have to be determined by routing beacons. That is, the qualified paths are identifies as the paths having the best quality. The best quality can be determined in any number of different ways. That is, other parameters and measurements can be used to determine the set of qualified paths. Routing beacons is one example of how the qualified paths can be determined.

Selected Data Transmission Rate

Mobile access nodes are likely to have transmission links that vary as the mobile access node moves. Therefore, each mobile access node selects a data transmission rate that corresponds with the lowest data transmission rate of the qualified routing paths. The lowest data transmission rate typically provides the most robust link.

Figure 4:
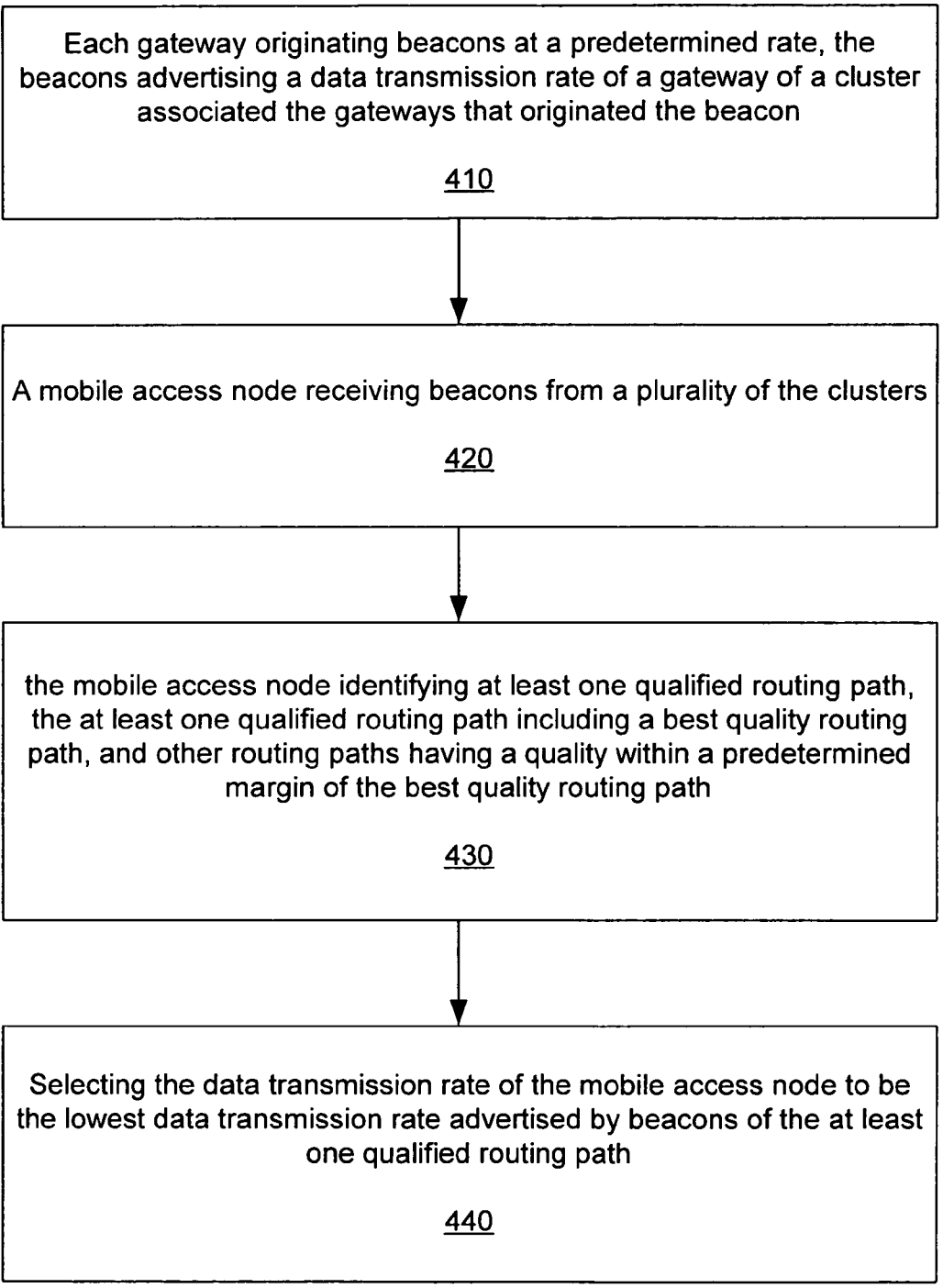
FIG. 4 is a flow chart showing one example of a method of a wireless mesh network selecting a data transmission rate of mobile access nodes within the wireless mesh network.

FIG. 4 is a flow chart showing one example of a method of a wireless mesh network selecting a data transmission rate of mobile access nodes within the wireless mesh network, wherein the wireless mesh network includes a plurality of gateways. A first step 410 includes each gateway originating beacons at a predetermined rate. The beacons advertise a data transmission rate of a cluster associated the gateways that originated the beacon. A second step 420 includes a mobile access node receiving beacons from a plurality of the clusters. A third step 430 includes the mobile access node identifying at least one qualified routing path, the at least one qualified routing path including a best quality routing path, and other routing paths having a quality within a predetermined margin of the best quality routing path. A fourth step 440 includes selecting the data transmission rate of the mobile access node to be the lowest data transmission rate advertised by beacons of the at least one qualified routing path.

Fixed Access Node Versus Mobile Access Node

Fixed access nodes generally remain within the same cluster at all times. Therefore, an embodiment include the fixed access nodes have a data transmission rate that corresponds with the cluster the fixed access node is associated with, and does not change. However, mobile access node can change cluster associations, and therefore, should have data transmission rates that can adapt as the mobile access node travels from one cluster to another cluster.

Mobile Access Node Routing Selections

Due to their mobility, the transmission links of mobile access nodes are likely to change more rapidly than the transmission links of fixed access nodes. Therefore, the quality of selected routes (and non-selected routes) is likely to change more rapidly than fixed access nodes. As a result, the routing selections of the mobile access nodes should occur more often, and place a greater weight on routing beacons most recently received.

An example of how a mobile access node selects an upstream routing path includes the mobile access nodes receiving routing packets (routing beacons) from at least one upstream access node. As described, the routing packets including information of at least one upstream access node along a path to a gateway access node. The mobile node assigns a weight to each received routing packet, in which the weight is dependent on how recently the routing packet is received. The mobile node calculates a packet success rate for each upstream link by summing routing packets weights over a period of time for each upstream link. The mobile node selects a routing path through at least one upstream access node based upon the packet success rate of routing packets received from each upstream access node.

An additional packet success rate calculation can include dividing the summed routing packet weight by a maximum possible number possible for the sum.

Although specific embodiments of the invention have been described and illustrated, the invention is not to be limited to the specific forms or arrangements of parts so described and illustrated. The invention is limited only by the appended claims.

What is claimed:

1. A method of a mobile access node selecting a data transmission rate, comprising:

receiving routing beacons from a plurality of wireless clusters, each routing beacon advertising a data transmission rate of a gateway of the wireless cluster that originates the routing beacon;

identifying a set of at least one qualified routing path, the set including a best quality routing path, and other routing paths having a quality within a predetermined margin of the best quality routing path, wherein the quality of the routing paths is determined by calculating a persistence of routing beacons successfully received by the mobile access node; and selecting the data transmission rate of the mobile access node based on the data transmission rate advertised by beacons of the at least one qualified routing path, wherein selecting the data transmission rate of the mobile access node based on the data transmission rate advertised by beacons of the at least one qualified routing path comprises selecting the data transmission rate of the mobile access node to be the lowest data transmission rate advertised by beacons of the at least one qualified routing path.

2. The method of claim 1, wherein the data transmission rate of each cluster is determined by data transmission rate advertised within beacons originating at a gateway associated with the cluster.

3. The method of claim 1, wherein determining the quality of received routing beacons comprises calculating a persistence of routing beacons received by the mobile access node.

4. The method of claim 3, wherein the persistence is calculated by counting a number of received routing beacons over a unit of time, and comparing with a maximum number of possible routing beacons over the unit of time.

5. The method of claim 4, wherein the maximum number of possible routing beacons is determined by a rate at which the routing beacons are originated at a gateway.

6. The method of claim 5, wherein each access node that receives routing beacons rebroadcasts the routing beacons at a rate at which they are successfully received.

7. The method of claim 1, wherein the predetermined margin is predetermined by specifying a percentage quality at which all qualified routing paths are within the best quality routing path.

8. A method of a wireless mesh network selecting a data transmission rate of mobile access nodes within the wireless mesh network, comprising:
   a plurality of gateways, each gateway originating beacons at a predetermined rate, the beacons advertising a data transmission rate of a cluster associated with the gateway that originated the beacon;
   a mobile access node receiving beacons from a plurality of the clusters;
   the mobile access node identifying at least one qualified routing path, the at least one qualified routing path including a best quality routing path, and other routing paths having a quality within a predetermined margin of the best quality routing path, wherein the quality of the routing paths is determined by calculating a persistence of routing beacons successfully received by the mobile access node;
   the mobile access node selecting the data transmission rate based on the data transmission rate advertised by beacons of the at least one qualified routing path, wherein selecting the data transmission rate of the mobile access node based on the data transmission rate advertised by beacons of the at least one qualified routing path comprises selecting the data transmission rate of the mobile access node to be the lowest data transmission rate advertised by beacons of the at least one qualified routing path.

9. The method of claim 8, wherein the data transmission rate of each cluster is dependent on a density of access nodes within each cluster.

10. The method of claim 8, wherein the data transmission rate of each cluster is dependent on distances between access nodes of each cluster.

11. The method of claim 8, wherein the data transmission rate of each cluster is dependent on link qualities between access nodes of each cluster.

12. The method of claim 8, wherein each fixed access node maintains the data transmission rate of the cluster the fixed access node is associated with, and mobile access nodes change their data transmission rate depending on which cluster the mobile access node is associated with.

13. The method of claim 8, wherein possible data transmission rates are determined by an IEEE 802.11 standard.

14. The method of claim 8, further comprising each access node associated with each cluster receiving beacons with associated data transmission rate, and re-broadcasting the beacons at a rate at which the routing beacons are successfully received by the access node.

15. A mobile access node of a wireless mesh network, comprising:
   means for receiving routing beacons from a plurality of wireless clusters of the wireless mesh network, each routing beacon advertising a data transmission rate of the wireless cluster that originates the routing beacon;
   means for identifying at least one qualified routing path, the at least one qualified routing path including a best quality routing path based upon a quality of the received routing beacons, and other routing paths having received routing beacons having a quality within a predetermined margin of the best quality routing path, wherein the quality of the routing paths is determined by calculating a persistence of routing beacons successfully received by the mobile access node; and
   means for selecting the data transmission rate of the mobile access node to be the lowest data transmission rate advertised by routing beacons of the at least one qualified routing path, wherein selecting the data transmission rate of the mobile access node based on the data transmission rate advertised by beacons of the at least one qualified routing path comprises selecting the data transmission rate of the mobile access node to be the lowest data transmission rate advertised by beacons of the at least one qualified routing path.

* * * * *